United States Patent [19]

Mueller et al.

[11] Patent Number: 4,705,061
[45] Date of Patent: Nov. 10, 1987

[54] DRIVE MECHANISM FOR A VALVE

[76] Inventors: Fritz Mueller, Neuer Wasen 6, 7118 Ingelfingen-Criesbach; Lothar Pienta, Teichstrasse 17, 7118 Ingelfingen 2, both of Fed. Rep. of Germany

[21] Appl. No.: 864,784

[22] Filed: May 19, 1986

[30] Foreign Application Priority Data

Jun. 7, 1985 [DE] Fed. Rep. of Germany ....... 3520502

[51] Int. Cl.$^4$ .................... F16K 31/60; F16K 31/05
[52] U.S. Cl. .................................... 137/269; 137/556; 251/129.03; 251/129.12; 474/135
[58] Field of Search ............... 251/129.03, 129.12; 137/556, 269; 474/133, 135

[56] References Cited

U.S. PATENT DOCUMENTS 4,213,480  7/1980  Orum et al. ..................... 137/556
4,220,313  9/1980  Petersen et al. ............ 251/129.03 X

FOREIGN PATENT DOCUMENTS 896896  5/1962  United Kingdom ........... 251/129.03

Primary Examiner—Arnold Rosenthal
Attorney, Agent, or Firm—Henry M. Feiereisen

[57] ABSTRACT

A drive mechanism for a spindle of a valve includes an electromotor with subsequently connected gear transmission which are arranged laterally offset to the axis as defined by the spindle to allow the latter to move in axial direction unimpeded from electromotor and gear transmission and to be adjustable to arbitrary strokes. The spindle is actuated by a nut which cooperates with the gear transmission and is locked in its quiescent stage to prevent a rotation thereof. The gear transmission is also manually actuatable via a crank handle whose grip portion in addition serves also a viewing glass when attaching the crank handle in elongation of the spindle at an appropriate location of the housing.

7 Claims, 5 Drawing Figures

DRIVE MECHANISM FOR A VALVE

FIELD OF THE INVENTION

The present invention refers to a drive mechanism for a valve and in particular for the spindle of a valve, especially a diaphragm valve.

BACKGROUND OF THE INVENTION

In known drive mechanisms for valves, an electromotor is provided with subsequently connected transmission to actuate a spindle e.g. by means of a nut linked to the spindle via a suitable thread. The electromotor and the transmission are arranged above the free end of the spindle of the valve. This arrangement is, however, disadvantageous as it considerably limits the stroke of the spindle.

OBJECT OF THE INVENTION

It is thus the principal object of the present invention to provide an improved drive mechanism for valves obviating the afore-stated drawbacks.

SUMMARY OF THE INVENTION

This object is realized in accordance with the present invention by arranging the electromotor and the transmission laterally offset to the axis as defined by the spindle. The offset arrangement according to the invention allows the spindle to move unimpededly from electromotor and transmission in axial direction and to be adjustable to arbitrary strokes. Thus, the provision of greater strokes than previously known is achieved.

According to another feature of the invention, the transmission is manually actuated via a hand crank in case the electromotor fails or other emergency situations arise. The hand crank is provided with a bevel gear which meshes with a bevel gear associated to the transmission so that the latter is driven when the the hand crank is suitably attached to the housing and rotated. In addition, the crank is provided with a grip which is hollow to define a blind hole and is made of translucent material to serve as viewing glass when connecting the hand crank to the housing at another location thereof that is in elongation of the spindle. Thus, the spindle can project with its free end into the blind hole to display its respective position.

The transmission may be represented by a toothed belt transmission which cooperates with a nut actuating the spindle. In order to prevent the nut from rotating i.e. further advancing or reversing after the spindle is adjusted, a pivoted idler pulley is provided which cooperates with the toothed belt driving the nut. The idler pulley is connected to a pawl which is engagable in a ratchet of the nut. In the quiescent stage of the nut i.e. after adjusting the spindle, the idler pulley is pulled against the toothed belt which is allowed to sag between the nut and the respective gear of the transmission so that the pawl can engage in the ratchet. When actuating the transmission and thus the nut to adjust the spindle, the toothed belt is tightened thereby moving the idler pulley in the other direction and disengaging the pawl from the ratchet.

BRIEF DESCRIPTION OF THE DRAWING

The above and others objects, features and advantages of the present invention will now be described in more detail with reference to the accompanying drawing in which.

SPECIFIC DESCRIPTION

Figure 1:
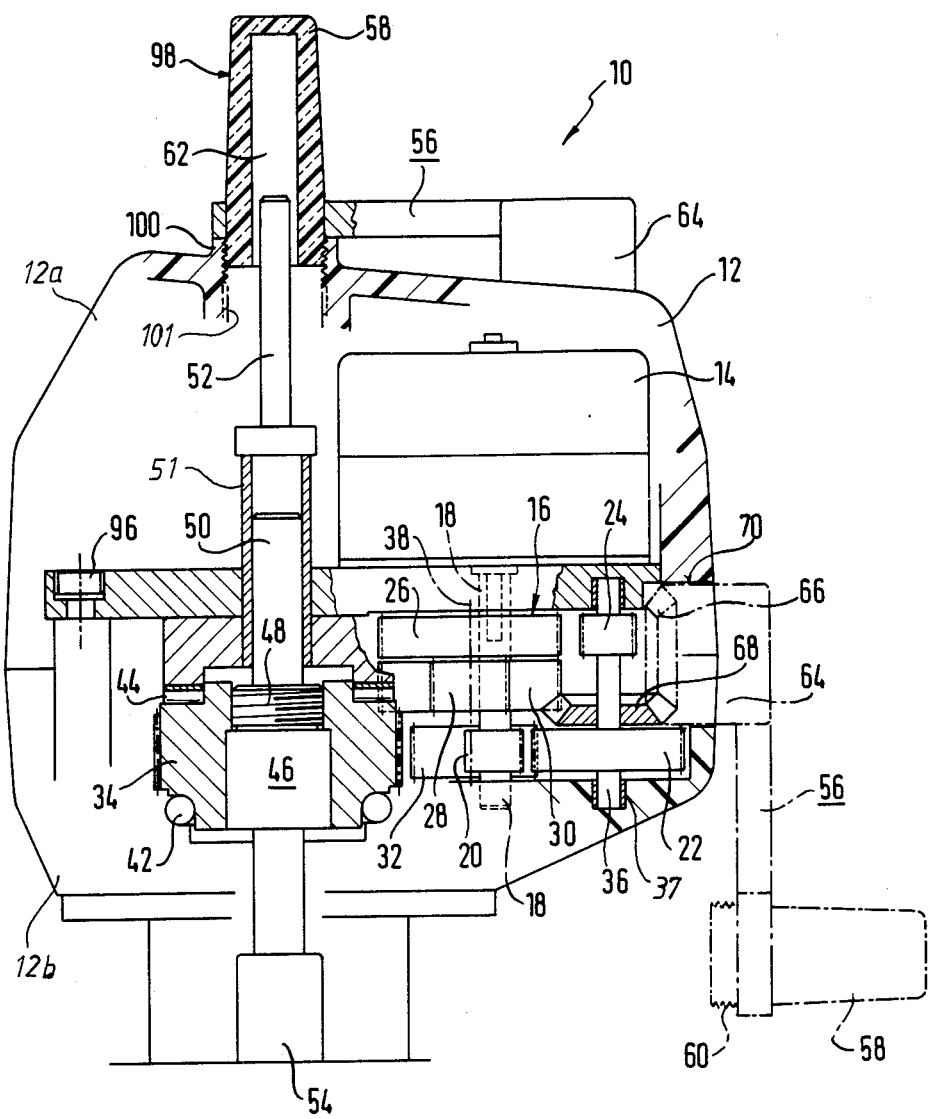
FIG. 1 is a schematic and partial cross sectional view of one embodiment of a drive mechanism according to the invention.

Referring firstly to FIG. 1, there is shown one embodiment of a drive mechanism according to the invention, generally designated by reference numeral 10 and provided for a valve, e.g. a diaphragm valve whose spindle is reciprocating in axial direction. The drive mechanism 10 includes a housing 12 which is made e.g. of a suitable plastic material and is preferably divided in two parts 12a,12b joined together e.g. by screws 96 (FIG. 1 discloses only one such screw 96).

The housing 12 accommodates an electromotor 14 provided with an output shaft 18 as indicated in FIG. 1 by broken line to actuate a spindle 46 via a gear transmission generally designated by reference numeral 16 as will be described hereinafter.

Figure 2:
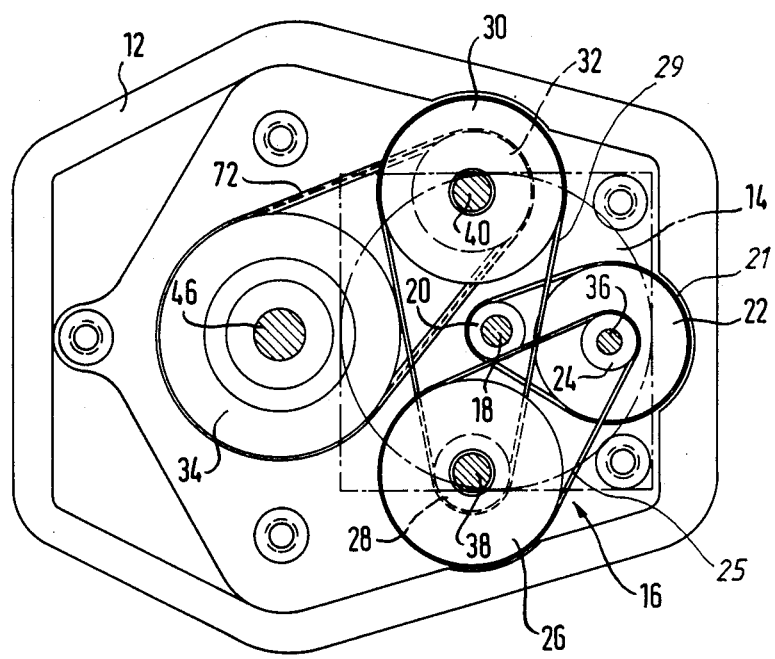
FIG. 2 is a schematic top view of a transmission of the driving mechanism.

The gear transmission 16 is especially illustrated in FIG. 2 and includes a pinion 20 which is fixedly supported on the output shaft 18 of the electromotor 14. A toothed belt 21 links the pinion 20 with a gear 22 which is supported on an axle shaft 36. Further supported on the axle shaft 36 at a distance to gear 22 is a gear 24 which is connected to a gear 26 via toothed belt 25. The gear 26 is provided on an axle shaft 38 which carries in addition a gear 28 linked to a gear 30 via a toothed belt 29. The gear 30 is supported on an axle shaft 40 which also carries a gear 32. The gear 32 cooperates with a nut 34 via a toothed belt 72. The nut 34 is supported by the housing 12 via suitable ball bearing 42 and roller bearing 44 which allow a rotation of the nut 34 but prevent an axial displacement thereof.

The axle shaft 36 is suitable supported by the housing 12 via e.g. bushing bearings 37. Although not illustrated in the drawing, the shafts 36 and 38 are supported in similar manner.

In the nonlimiting example as shown in FIG. 2, the transmission 16 results in a gearing down which means that the diameter of gear 22 is greater than the diameter of the pinion 20, the diameter of gear 26 is greater than the diameter of gear 24, and the diameter of nut 34 is greater than the diameter of gear 32. It should be pointed out, however, that other relationships between the respective diameters or different transmissions are certainly feasible.

As is shown in FIG. 1, the spindle 46 projects through the nut 34 and is coupled to the latter via a suitable motion thread 48 to allow the rotation of the nut 34 to be converted into an axial displacement of the spindle 46 in either direction depending on the direction of rotation of the nut 34. As thread 48, a trapezoid thread or an epicyclic ball thread may e.g. be provided. The spindle 46 is supported in a sleeve 54 and suitably guided in axial direction in order to prevent the spindle from turning.

According to the invention, the electromotor 14 and the gear transmission 16 are laterally accommodated within the housing 12 at a distance to the axis of the spindle 46 and thus are arranged completely outside the area of motion of the spindle 46. Consequently, the spindle 46 can be displaced through the housing 12 unimpeded from electromotor 14 and gear transmission 16 and if necessary may project beyond the upper part 12a of the housing 12 depending on the respective stroke.

In the embodiment of FIG. 1, the spindle 46 is provided with an upper end 50 which is guided in a respective bushing 51 during reciprocating movement and cooperates with an extension or extension piece 52 to allow a visual indication of the stroke of the spindle 46 in a manner to be described hereinbelow.

In elongation of the extension piece 52, the upper part 12a of the housing 12 is integrally provided at its top surface with a cylindrical sleeve 100 which includes an internal thread 101. Screwable into the sleeve 100 is a hand crank 56 whose grip 58 is provided with a thread 60 meshing with the thread 101 of the sleeve 100. The grip 58 is hollow to define a blind hole 62 and is made of translucent material to serve as a viewing glass generally designated by reference numeral 98.

When attaching the grip 58 within the sleeve 100, the extension piece 52 can project into the blind hole 62 to indicate the position and thus the stroke of the spindle 46.

During an interruption of the electromotor 14 or other undesirable failures or breakdowns, the crank 56 is additionally usable to manually actuate or turn the gear transmission 16 during such emergencies. As indicated in FIG. 1 in dash-dotted line at the right hand side, the crank 56—after being removed by disengaging the grip 58 from the sleeve 100—is attached in its second working position to the side of the housing 12. The crank 56 is provided at its end remote to the grip 58 with a projection 64 extending perpendicular to the crank 56. At its end face remote to the crank 56, the projection 64 is provided with a bevel gear 66. In the second working position of the crank 56, the projection 64 is inserted into a cylindrical opening 70 at the side of the housing 12 until the bevel gear 66 meshes with a bevel gear 68 which is supported on the axle shaft 36 in a rotation-fixed manner.

During manual actuation of the gear transmission 16, the crank 56 is rotated in desired direction so that the bevel gear 66 rotates the bevel gear 68 which in turn actuates via the axle shaft 36 the gear 24 and eventually the nut 34 to displace the spindle 46. After manually adjusting the spindle 46 in this manner, the crank 56 is removed from the opening 70 and attached with its grip 58 to the sleeve 100 of the housing 12. After removing the crank 56, the opening 70 is sealed off by a suitable plug (not shown). When being in this first working position—as indicated by continuous line in FIG. 1—the projection 64 and the bevel gear 66 of the crank 56 engage in a respective recess (not shown) at the top surface of the housing 12.

Figure 3A:
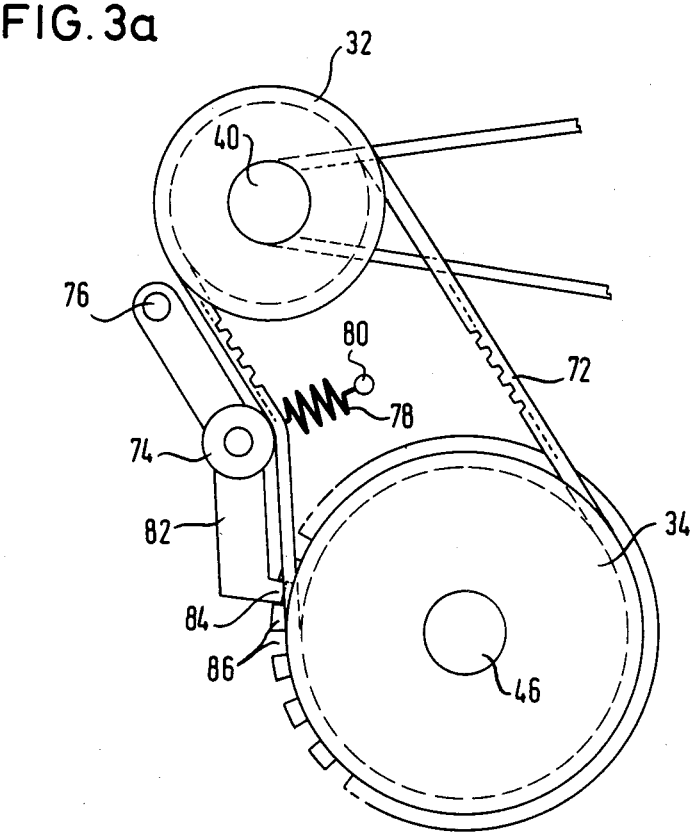
FIG. 3a is a top view of a locking device of the driving mechanism for arresting a nut during its quiescent condition.
Figure 3B:
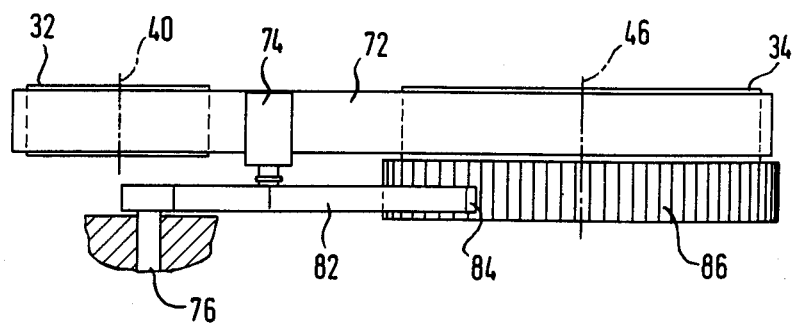
FIG. 3b is a side view of the locking device.

Turning now to FIGS. 3a and 3b which show a locking device for arresting the nut 34 during quiescent condition so that the adjusted position of the spindle 46 is not undesirably altered by a further rotation of the nut 34. As is illustrated in FIG. 3a, the toothed belt 72 cooperates with a idler pulley 74 which is swingably mounted about a pivot 76 supported in the housing 12. The idler pulley 74 is continuously pressed or pushed against the driving run of the toothed belt 72 by a tension spring 78 which is fixed at 80 to the housing 12.

The idler pulley 74 is provided with an arm or lever 82 which includes a catch 84 extending perpendicular to the lever 82 at the end remote to the idler pulley 82. The catch 84 is directed towards the nut 34 which uses a ratchet 86 extending about the circumference of the nut 34 at a distance thereto as is illustrated in FIG. 3b.

In the position as shown in FIG. 3a, the nut 34 is in the quiescent state i.e. upon idle transmission 16 so that the tension spring 78 presses the idler pulley 74 against the sagging toothed belt 72 and the catch 84 is forced into the ratchet 86 to arrest and lock the nut 34 against a rotational motion. When actuating the drive mechanism 10 to run the gear transmission 16, the toothed belt 72 will be tightened so that the idler pulley 74 is moved in counterclockwise direction thereby disengaging the catch 84 from the ratchet 86.

Figure 4:
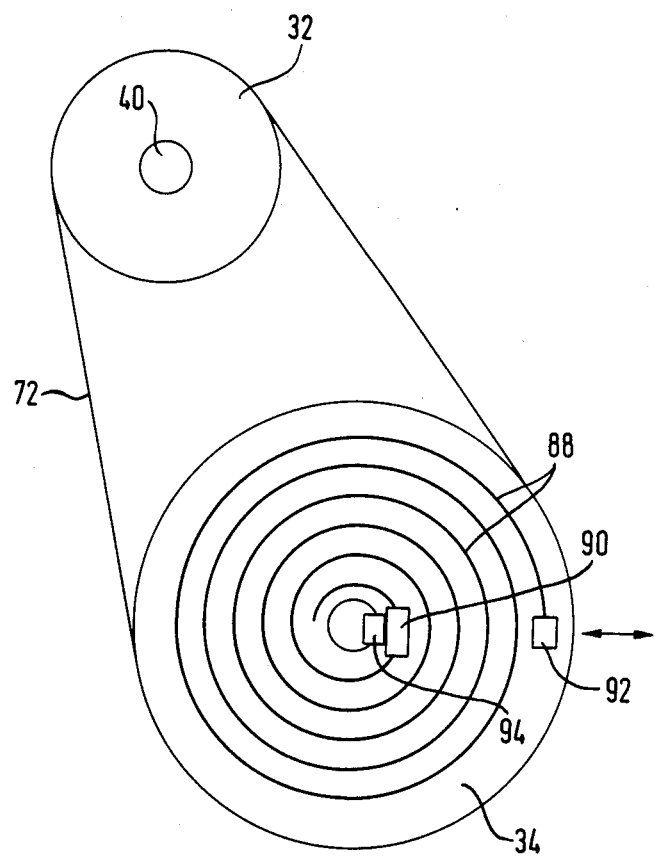
FIG. 4 is a schematic top view of the nut.

Turning now to FIG. 4, it can be seen that the nut 34 is provided at is top surface with a spiral groove 88 which extends concentric to the center axis of the nut 34 (FIG. 4). Engaging in the groove 88 is a sliding block 90 which is suitably guided and moves radially towards the outside or inside depending on the rotation of the nut 34. Cooperating with the sliding block 90 is a pair of end switches 92,94 supported by the housing 12 and positioned at the respective ends of the groove 88. Upon reaching the ends of the groove 88, the sliding block 90 actuates the respective one of the switches 92,94 so that e.g. the direction of rotation of the gear transmission 16 can be reversed. Through the provision of the sliding block 90, not only a sensitive control even of smallest strokes is obtained but also very large strokes can be provided by the cooperation between the sliding block 90 and the end switches 92,94.

While the invention has been illustrated and described as embodied in a Drive Mechanism for a Valve, it is not intended to be limited to the details shown since various modifications and structural changes may be made without departing in any way from the spirit of my present invention.

What is claimed as new and desired to be protected by Letters Patent is set forth in the appended claims.

We claim:

1. A drive mechanism for a spindle of a valve, comprising:
    a housing accommodating said spindle defining an axis;
    an electromotor;
    a gear transmission cooperating with said electromotor for actuating said spindle, said electromotor and said gear transmission being arranged within said housing at a distance to said axis of said spindle so that said spindle is axially movable without any interference by said electromotor and said gear transmission and adjustable to arbitrary strokes;
    and actuating means for manually driving said gear transmission and including a hand crank attachable to said housing to act on said gear transmission for driving the latter upon rotating said hand crank, said hand crank being provided with a grip which is made of translucent material to serve as viewing glass for allowing to monitor the position of said spindle.

2. A drive mechanism as defined in claim 1 wherein said hand crank is provided with a first bevel gear, said gear transmission including a second bevel gear meshing with said first bevel gear when attaching said hand crank.

3. A drive mechanism as defined in claim 1 wherein said spindle defines a free end, said housing being provided with an opening in elongation of said free end of said spindle, said grip of said crank being hollow to define a blind hole and being insertable in said opening so as to allow said free end of said spindle to project into said blind hole for indicating the position of said spindle.

4. A drive mechanism as defined in claim 1, and further comprising a nut coupled to said spindle, said gear transmission actuating said spindle via said nut in such a manner that a rotation of said nut causes said spindle to move in direction of said axis.

5. A drive mechanism for a spindle of a valve, comprising:
   a housing accommodating said spindle defining an axis;
   an electromotor;
   a gear transmission cooperating with said electromotor for actuating said spindle, said electromotor and said gear transmission being arranged within said housing at a distance to said axis of said spindle so that said spindle is axially movable without any interference by said electromotor and said gear transmission and adjustable to arbitrary strokes;
   a nut coupled to said spindle, said gear transmission being a toothed belt transmission actuating said spindle via said nut and including a toothed belt cooperating with said nut; and
   locking means for arresting said nut during quiescent condition, said locking means including a pivoted idler pulley acting against said toothed belt and being provided with a lever at whose one end a catch is arranged, said nut cooperating with a ratchet which is engagable by said catch to prevent a rotation of said nut during quiescent condition thereof.

6. A drive mechanism as defined in claim 5 wherein said nut is provided with a spiral groove at one end face thereof, and further comprising a sliding block radially movable within said groove between two end positions during rotation of said nut.

7. A drive mechanism as defined in claim 6, and further comprising two end switches respectively provided at said end positions, said sliding block actuating said end switches when reaching said end positions.

* * * * *